United States Patent
Chen et al.

(10) Patent No.: US 10,561,936 B1
(45) Date of Patent: Feb. 18, 2020

(54) LANYARD AND CONTROLLER ASSEMBLY

(71) Applicant: Facebook Technologies, LLC, Menlo Park, CA (US)

(72) Inventors: Yi-Yaun Chen, Seattle, WA (US); Shane Michael Ellis, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 125 days.

(21) Appl. No.: 15/964,732

(22) Filed: Apr. 27, 2018

(51) Int. Cl.
*A63F 13/24* (2014.01)
*A45F 5/00* (2006.01)
*A63F 13/98* (2014.01)

(52) U.S. Cl.
CPC ........ *A63F 13/24* (2014.09); *A45F 2005/006* (2013.01); *A63F 13/98* (2014.09)

(58) Field of Classification Search
CPC .. A63F 13/24; A63F 13/98; A45F 2200/0516; A45F 2200/0533; A45F 2200/0508; A45F 2200/0525; A45F 2005/006; A45F 2005/1013
USPC ............... 224/255, 219, 220, 221, 930, 257; 24/3.13
See application file for complete search history.

(56) References Cited

U.S. PATENT DOCUMENTS

| | | |
|---|---|---|
| 1,421,730 A | 7/1922 | Lino |
| 1,637,003 A | 7/1927 | Slayton |
| 4,118,838 A | 10/1978 | Schiefer et al. |
| 4,453,292 A | 6/1984 | Bakker |
| 5,323,514 A | 6/1994 | Masuda et al. |
| 5,361,461 A | 11/1994 | Anscher |
| 5,435,044 A | 7/1995 | Ida |
| 5,799,895 A | 9/1998 | Michaud et al. |
| 6,029,870 A | 2/2000 | Giacona, III |
| 6,182,169 B1 * | 1/2001 | Force, Sr. ............. G06F 1/1626 224/219 |
| 6,352,186 B1 * | 3/2002 | Endo ...................... H04B 1/385 224/254 |
| 6,658,704 B2 | 12/2003 | Buscart |
| 6,802,279 B1 | 10/2004 | Johnson |
| 6,820,664 B1 | 11/2004 | Ritch |
| 6,883,694 B2 * | 4/2005 | Abelow .................. G06F 1/163 224/666 |
| 7,254,871 B2 | 8/2007 | Yoshiguchi |

(Continued)

OTHER PUBLICATIONS

Heather, "Wrapped toilet paper and other guest essentials for the holidays," Girl Gone Mom, Nov. 18, 2015, pp. 1-4.

*Primary Examiner* — Justin M Larson
(74) *Attorney, Agent, or Firm* — Fenwick & West LLP (57) ABSTRACT

Disclosed herein is a controller lanyard assembly that minimizes accidental damage to a controller. The controller includes a removable front cover that, when removed, exposes a receptacle that includes a cavity that receives a portion of the lanyard. The cavity of the receptacle is further connected through a channel located on an external surface of the controller. A first portion of the lanyard can reside within the cavity and a second portion of the lanyard can exit through the channel of the controller. The receptacle can further include detents that protrude into the channel, thereby preventing the first portion of the lanyard from exiting the cavity of the receptacle. Altogether, the first portion of the lanyard is coupled to the controller while the second portion of the lanyard is worn by the individual.

13 Claims, 6 Drawing Sheets

(56) References Cited

U.S. PATENT DOCUMENTS

| | | | |
|---|---|---|---|
| 7,469,809 B2* | 12/2008 | Rodarte | A45F 5/00 224/218 |
| D604,199 S | 11/2009 | Kolasa | |
| 7,699,664 B2 | 4/2010 | Kim et al. | |
| 7,715,192 B2* | 5/2010 | Takahama | H04M 1/0202 361/679.56 |
| 8,014,133 B2* | 9/2011 | Dong | H04M 1/0202 248/317 |
| 8,194,405 B2* | 6/2012 | Dong | H04M 1/026 224/255 |
| 8,199,492 B2* | 6/2012 | Liang | H04M 1/0202 242/164 |
| 8,208,978 B2* | 6/2012 | Stiehl | A45C 13/30 224/255 |
| 8,210,406 B2 | 7/2012 | Moreau et al. | |
| 8,561,862 B2* | 10/2013 | Foggiato | A45F 5/00 224/217 |
| 8,915,409 B2* | 12/2014 | Smith | B65H 75/4428 224/162 |
| 9,016,534 B2 | 4/2015 | Whitley et al. | |
| 9,017,296 B2 | 4/2015 | Beck et al. | |
| 9,265,294 B2 | 2/2016 | Ellis et al. | |
| 9,532,639 B2* | 1/2017 | Kimble | A45F 5/00 |
| 9,801,295 B2* | 10/2017 | Tompkins | H05K 5/0217 |
| 10,306,972 B2* | 6/2019 | Mendez | A45F 5/00 |
| 10,441,880 B2* | 10/2019 | Anderson | A63F 13/24 |
| 10,447,265 B1* | 10/2019 | Tompkins | G06F 3/0202 |
| 2001/0035442 A1* | 11/2001 | Yokobori | A45C 13/26 224/197 |
| 2005/0274755 A1* | 12/2005 | Lee | A45F 5/00 224/255 |
| 2006/0138182 A1* | 6/2006 | Carlsson | A45F 5/10 224/257 |
| 2007/0131727 A1* | 6/2007 | Martuccio | A45F 5/00 224/257 |
| 2007/0278265 A1 | 12/2007 | Contente | |
| 2008/0222849 A1* | 9/2008 | Lavoie | A45F 5/02 24/3.13 |
| 2009/0086440 A1* | 4/2009 | Takahama | H04M 1/0202 361/724 |
| 2009/0120980 A1* | 5/2009 | Calayo | A45F 5/02 224/257 |
| 2009/0185071 A1* | 7/2009 | Suzuki | G03B 17/02 348/375 |
| 2009/0227381 A1* | 9/2009 | Snavely, II | A63F 13/98 463/47 |
| 2010/0018015 A1* | 1/2010 | Moore | A45F 5/00 24/586.11 |
| 2010/0165554 A1* | 7/2010 | Dong | H04M 1/0202 361/679.01 |
| 2011/0036879 A1* | 2/2011 | Calayo | A45F 5/00 224/267 |
| 2014/0048574 A1* | 2/2014 | Kimble | A45F 5/00 224/257 |
| 2015/0001263 A1* | 1/2015 | Chen | F16B 5/0258 224/257 |
| 2015/0305480 A1 | 10/2015 | Brousseau | |
| 2016/0221252 A1 | 8/2016 | Ellis et al. | |
| 2017/0368450 A1* | 12/2017 | Lamb | A63F 13/98 |

* cited by examiner

LANYARD AND CONTROLLER ASSEMBLY

CROSS-REFERENCE TO RELATED APPLICATIONS

This application is related to U.S. patent application Ser. No. 15/693,443 filed on Aug. 31, 2017 and U.S. patent application Ser. No. 15/693,436 filed on Aug. 31, 2017.

BACKGROUND

This disclosure generally relates to a device assembly, and more specifically, to an assembly including a lanyard and a handheld controller.

Controllers are used in controlling electronics during various activities, such as during virtual reality (VR) activities and/or gaming. Many controllers are designed to be hand-held and can therefore be easily controlled by hand. However, during many of these activities, hand-held controllers run the risk of being inadvertently dropped or thrown, thereby resulting in undesirable damage being inflicted to the controller.

SUMMARY

Embodiments relate to an assembly between a controller and a lanyard. The controller includes a removable front cover that, when removed, exposes a receptacle that receives a portion of the lanyard. The receptacle includes a first cavity that is connected to a second cavity. The second cavity is further connected through a channel to an external surface of the controller. A first portion of the lanyard can reside within the second cavity of the controller while a second portion of the lanyard can reside external to the controller by passing through the channel. In various embodiments, the receptacle further includes detents that protrude into the cavity. The detents prevent the first portion of the lanyard from exiting the controller via the channel.

To achieve the coupling between the lanyard and the controller, the removable front cover of the controller is removed to expose the receptacle. The first portion of the lanyard is entered into the first cavity of the receptacle and further entered into the second cavity of the receptacle. The removable front cover can be recoupled with the controller. In this state, the first portion of the lanyard resides within the second cavity of the receptacle within the controller while the second portion of the lanyard can be worn by an individual (e.g., wrapped around an individual's wrist).

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. For example, a letter after a reference numeral, such as "detent 375A," indicates that the text refers specifically to the element having that particular reference numeral. A reference numeral in the text without a following letter, such as "detent 375," refers to any or all of the elements in the figures bearing that reference numeral (e.g. "detent 375" in the text refers to reference numerals "detent 375A" and/or "detent 375B" in the figures)

Example Controller and Lanyard Assembly

Figure 1A:
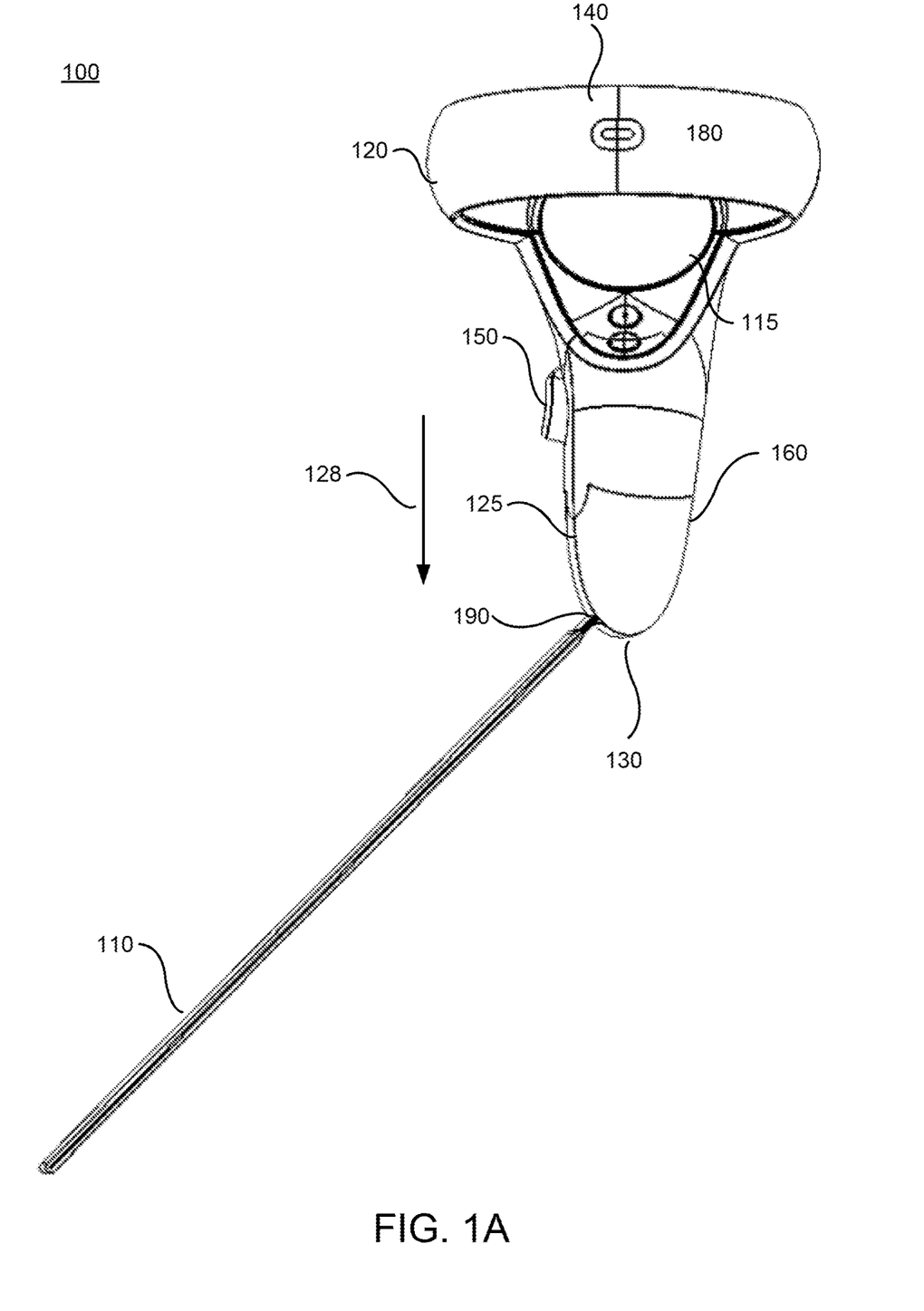
FIG. 1A depicts a front view of an example controller and lanyard assembly, in accordance with an embodiment.
Figure 1B:
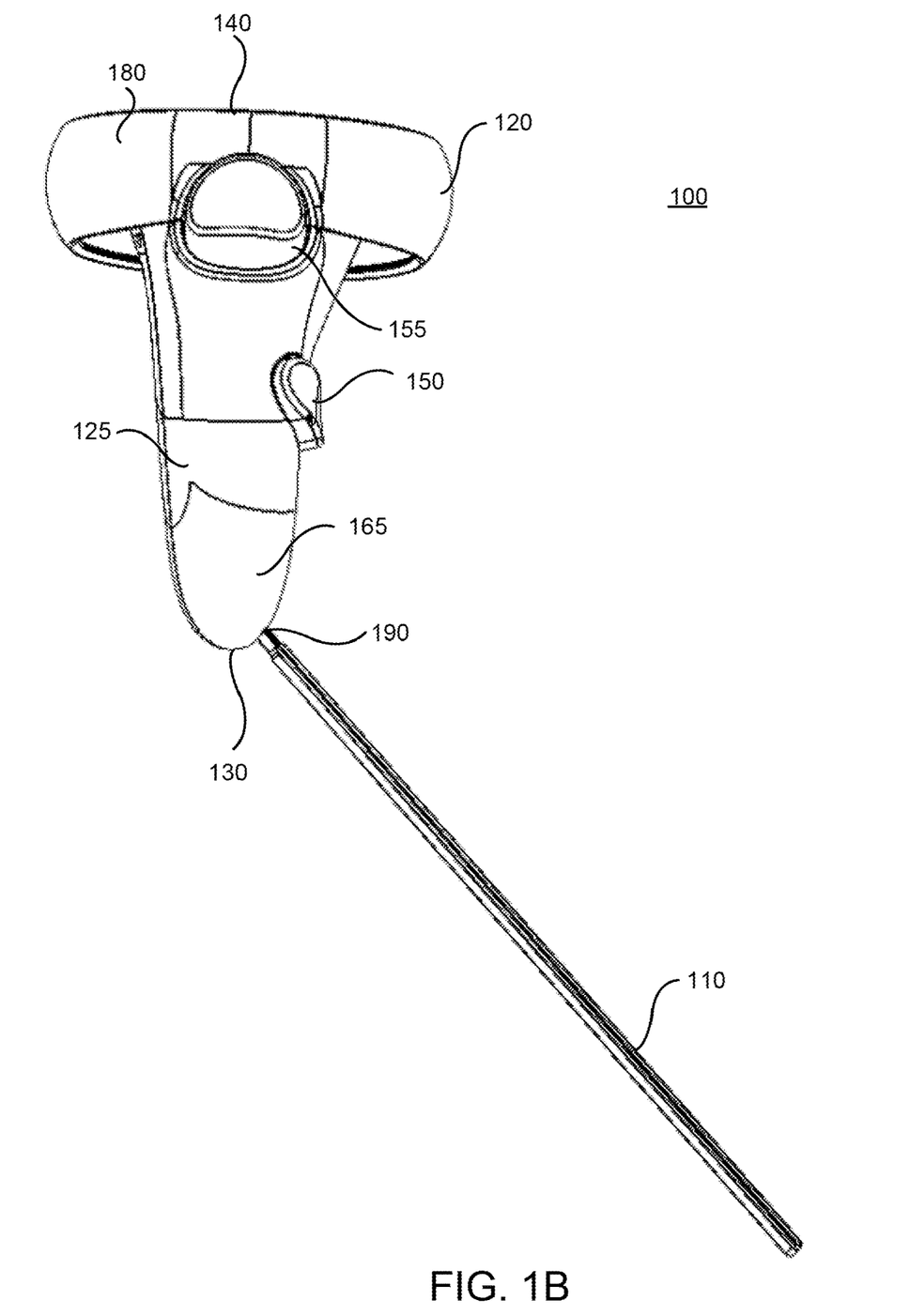
FIG. 1B depicts a rear view of an example controller and lanyard assembly, in accordance with an embodiment.

FIG. 1A depicts a front view of an example controller and lanyard assembly 100, in accordance with an embodiment. FIG. 1B depicts a rear view of the example controller and lanyard assembly 100, in accordance with an embodiment. In various embodiments, the assembly 100 includes a controller 120 and a lanyard 110.

The controller 120 may enable a user to manipulate objects in a virtual space with precision and intuitive, natural hand movement. The controller 120 may have a first end 130 and a second end 140. The controller 120 can be composed of a solid material such as metal, ceramic, plastic, and the like. As shown in FIGS. 1A and 1B, a controller 120 can include, among other components, a front interface 115, a handle 125, a ring 180, a side button 150, a front cover 160, a rear panel 165, and a trigger button 155. The controller 120 can additionally include components located internally within the controller 120, such as a receptacle, which will be discussed in further detail below in relation to FIG. 3. In various embodiments, additional or fewer components are included in the controller 120. As an example, the controller 120 can further include communication electronics (e.g., for transmitting data via Bluetooth, WiFi, LTE, and the like). Therefore, the controller 120 can be used for a variety of purposes such as for gaming purposes.

The front interface 115 can be a touch interface. The front interface 115 can receive user inputs. As an example, the front interface 115 can be a capacitive touch screen. Therefore, a user of the controller 120 can interact with the controller 120 through the front interface 115.

The handle 125 of the controller 120 extends along a length 128 of the controller 120. The handle 125 may be composed of an engineering plastic, such as injection-molded polycarbonate (PC)/acrylonitrile butadiene styrene (ABS) or polyamide (nylon). In other embodiments, the handle 125 may be composed of wood or metal. The handle 125 may be resistant to impact and abrasion. The material of the handle 125 may possess qualities such as an ability to withstand damage from particular temperature ranges, a mechanical strength, or a rigidity. In various embodiments, the handle 125 is shaped (e.g., contoured) and dimensioned to be held within a user's hand. For example, the handle 125 may be cylindrically shaped. The handle 125 of the held controller 120 may bend or curve to balance the weight of the controller 120, such that it rests naturally in the palm of the user.

The ring 180 forms the second end 140 of the handle 125. The ring 180 may be composed of engineered plastic. In one embodiment, the ring is made of infrared-transparent polycarbonate. In various embodiments, the ring 180 includes sensors located at various positions around the ring 180. The sensors located within the ring 180 allow the tracking of the controller's movement in six degrees of freedom.

As shown in FIG. 1B, the trigger button 155 is located on the rear-side of the controller 120. Additionally, the side button 150 is located on a side of the handle 125 of the controller 120. Each of the trigger button 155 and side button 150 may be accessible by a user's finger, such as a user's index or middle finger, when the user holds the handle 125 of the controller 120. The trigger button 155 and side button 150 each provide the user with functionality, such as functionality in a game or a VR experience. Each of the trigger button 155 and the side button 150 may have a symmetrical shape, such as rectangular, elliptical or circular and each may be made of rubber or plastic.

As shown in FIG. 1A, the front cover 160 is located on the front side of the controller 120. The front cover 160 forms at least a portion of the handle 125. In various embodiments, the front cover 160 is detachable from the rest of the controller 120. Once the front cover 160 is detached, a user can access internal components of the controller 120. As shown in FIG. 1B, the rear panel 165 is located on the rear side of the controller 120. The rear panel 165 forms at least a portion of the handle 125. In various embodiments, the rear panel 165 is non-detachable from the controller 120. The front cover 160 and the rear panel 165 can be coupled to one another to form the first end 130 of the controller 120. In various embodiments, the front cover 160 and rear panel 165 can couple with one another through attaching features such as buttons or latches.

The rear panel 165 can include a channel 190 near the first end 130 of the controller 120. In various embodiments, the channel 190 is a through-hole that passes through the rear panel 165. The channel 190 enables a portion of the lanyard 110 to reside on an internal side of the rear panel 165, thereby enabling the lanyard 110 to couple with the controller 120.

Figure 1C:
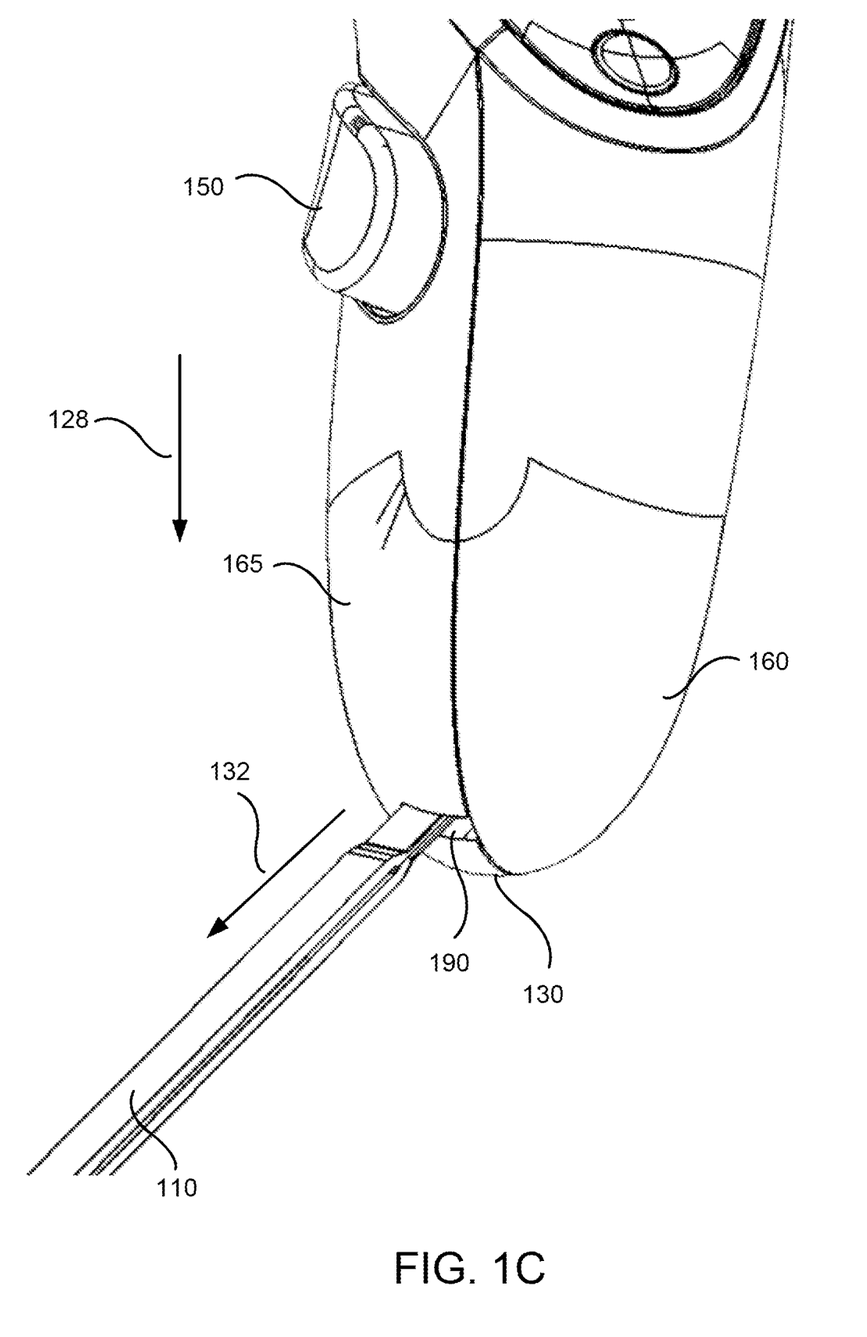
FIG. 1C depicts a zoomed perspective view of the controller, in accordance with an embodiment.

Reference is now made to FIG. 1C, which depicts a zoomed in, perspective view of the channel 190 of the controller 120, in accordance with an embodiment. Specifically, FIG. 1C depicts the channel 190 of the rear panel 165 of the controller 120 through which the lanyard 110 passes through.

In various embodiments, the channel 190 is located on the rear panel 165 such that the lanyard 110 exits from the channel 190 in a particular direction 132 relative to the length 128 of the controller 120.

Figure 2:
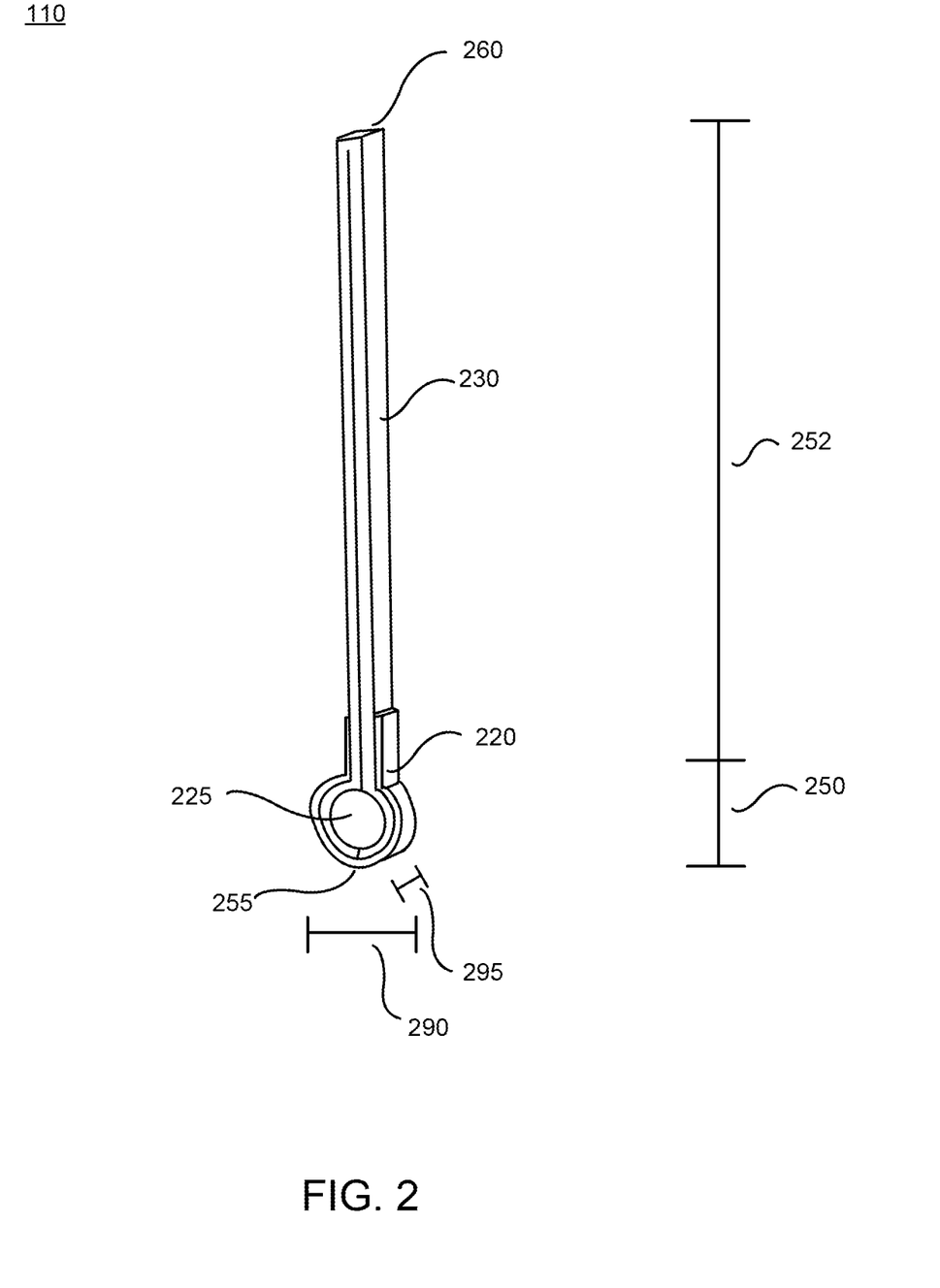
FIG. 2 depicts a perspective view of a lanyard, in accordance with an embodiment.

FIG. 2 depicts a perspective view of the lanyard 110, in accordance with an embodiment. The lanyard 110 can have a first portion 250 that includes a first end 255 of the lanyard 110 and a second portion 252 that includes the second end 260 of the lanyard 110. In various embodiments, when the lanyard 110 is coupled to the controller 120, the first portion 250 of the lanyard 110 resides within the controller 120. Additionally, the second portion 252 of the lanyard 110 resides external to the controller 120. For example, the second portion 252 of the lanyard 110 can be looped around a wrist of the user, thereby ensuring that the controller 120 is attached to the user's wrist via the lanyard 110.

In various embodiments, portions of the lanyard 110 can be formed using multiple components including a strap 230, a fabric strip 220, and a stopper 225. Each of the strap 230 and fabric strip 220 may be formed from flexible material such as any one of nylon, polyester, silk, rayon, polypropylene, polyethylene, aramid, and the like. The stopper 225 may be formed from a solid material such as a metal or a plastic.

Referring to the first portion 250 of the lanyard 110, it includes the stopper 225, a portion of the fabric strip 220, and a portion of the strap 230. As shown in FIG. 2, the stopper 225, strap 230, and fabric strip 220 may be arranged in layers such that the stopper 225 resides internal to the strap 230, which further resides internal to the fabric strip 220. Together, the layered stopper 225, strap 230, and fabric strip 220 form a width 290 and a depth 295 of the first end 255 of the lanyard 110. Generally, the width 290 and depth 295 of the first end 255 of the lanyard 110 is designed to ensure that the first portion 250 of the lanyard 110 cannot exit through the channel 190 of the controller 120, thereby enabling the lanyard 110 to couple with the controller 120.

The second portion 252 of the lanyard 110 includes a portion of the strap 230. Generally, the strap 230 in the second portion 252 of the lanyard 110 is flexible and can form a loop such that an individual can place his/her hand through the loop and wear the lanyard 110.

The lanyard 110 is formed using a strap 230, a fabric strip 220, and a stopper 225 is further described in U.S. patent application Ser. No. 15/693,443, filed on Aug. 31, 2017, which is hereby incorporated by reference in its entirety. In other embodiments, other designs of a lanyard 110 can be used to couple the lanyard 110 with a controller 120. As an example, a lanyard 110 can be formed using a strap and a stopper 225 (e.g., without a fabric strip 220). Lanyards of other structure may also be used in conjunction with embodiments described herein.

Figure 3:
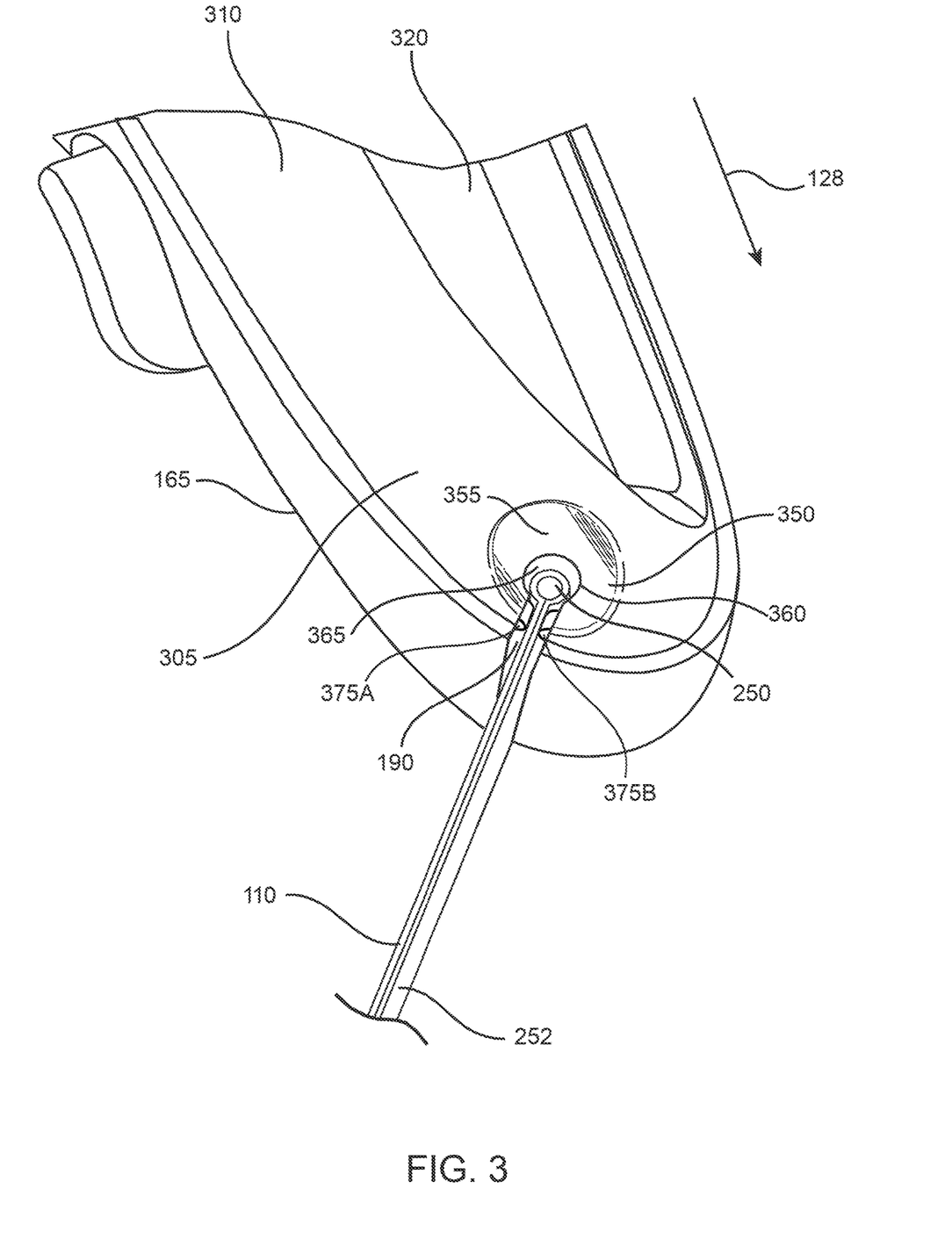
FIG. 3 depicts a perspective view of the attachment point between the lanyard and controller, in accordance with an embodiment.

FIG. 3 depicts a perspective view of the attachment point between the lanyard 110 and controller 120, in accordance with an embodiment. Specifically, FIG. 3 depicts a view of a receptacle 305 of the controller 120 with the front cover 160 of the controller 120 removed. Additional reference will be made to features shown in FIG. 3 which include the battery opening 320, surface 310 of the receptacle 305, first cavity 350, walls 355 of the first cavity 350, second cavity 360, walls 365 of the second cavity 360, channel 190, and detents 375A and 375B.

The receptacle 305 can be composed of engineered plastic, an example of which is polycarbonate. Here, the receptacle 305 includes a battery opening 320, a surface 310, a first cavity 350, and a second cavity 360. Additionally, the receptacle 305 can include one or more detents 375 that aid in the coupling of the lanyard 110 to the controller 120. The detents 375 are discussed in further detail below in reference to FIG. 4.

A battery opening 320 is shaped and dimensioned to receive a battery for powering the controller 120. As shown in FIG. 3, the battery opening 320 extends along the length 128 of the controller 120. The surface 310 is situated adjacent to the battery opening 320 and extends along the length 128 of the controller 120. In various embodiments, the surface 310 of the receptacle 305 may have a particular curvature. In one embodiment, the curvature of the surface 310 is substantially the same as the curvature of the removable front cover 160. Therefore, the curvature of the surface 310 enables the surface 310 of the receptacle 305 to sit flush with an internal side of the front cover 160 when the front cover is attached to the controller 120.

The surface 310 of the receptacle 305 is formed with the first cavity 350 and the second cavity 360. The first cavity 350 is formed around the periphery of the second cavity 360. In various embodiments, each of the first cavity 350 and the second cavity 360 are circular in shape. In various embodiments, the first cavity 350 is larger than the second cavity 360. Specifically, an entrance of the first cavity 350 is larger than an entrance of the second cavity 360.

The first cavity 350 is concaved relative to the surface 310 so that insertion of the first portion 250 of the lanyard 110 can be facilitated during assembly of the lanyard 110 onto the controller 120. The walls 355 of the first cavity 350 downwardly curve towards the second cavity 360.

As shown in FIG. 3, the second cavity 360 is located along the walls 355 of the first cavity 350. The second cavity 360 is located at the center of the first cavity 350 and is further connected to the channel 190. In FIG. 3, the channel 190 extends from the rear panel 165 into the body of the controller 125 to the second cavity 360. The channel 190, however, may be oriented and shaped in a manner different from what is shown in FIG. 3. The second cavity 360 receives the first portion 250 of the lanyard 110 and secures the first portion 250 when the front cover 160 is assembled onto the controller 120. As depicted in FIG. 3, the first portion 250 of the lanyard 110 resides in the second cavity 360, and the second portion 252 of the lanyard 110 exits along the channel 190.

In various embodiments, the second cavity 360 is dimensioned to mimic the shape of the first portion 250 of the lanyard 110. For example, the second cavity 360 may have walls 365 that are rounded such that the walls 365 of the second cavity 360 are in contact along the rounded first end 255 of the first portion 250 of the lanyard 110. In other words, the angle of curvature of the walls 365 may be similar (e.g., within 10%) to the angle of curvature of the first end 255 of the lanyard 110. In various embodiments, the diameter of the second cavity 360 is substantially similar (e.g., within 10%) to the width 290 of the first end 255 of the lanyard 110.

Figure 4:
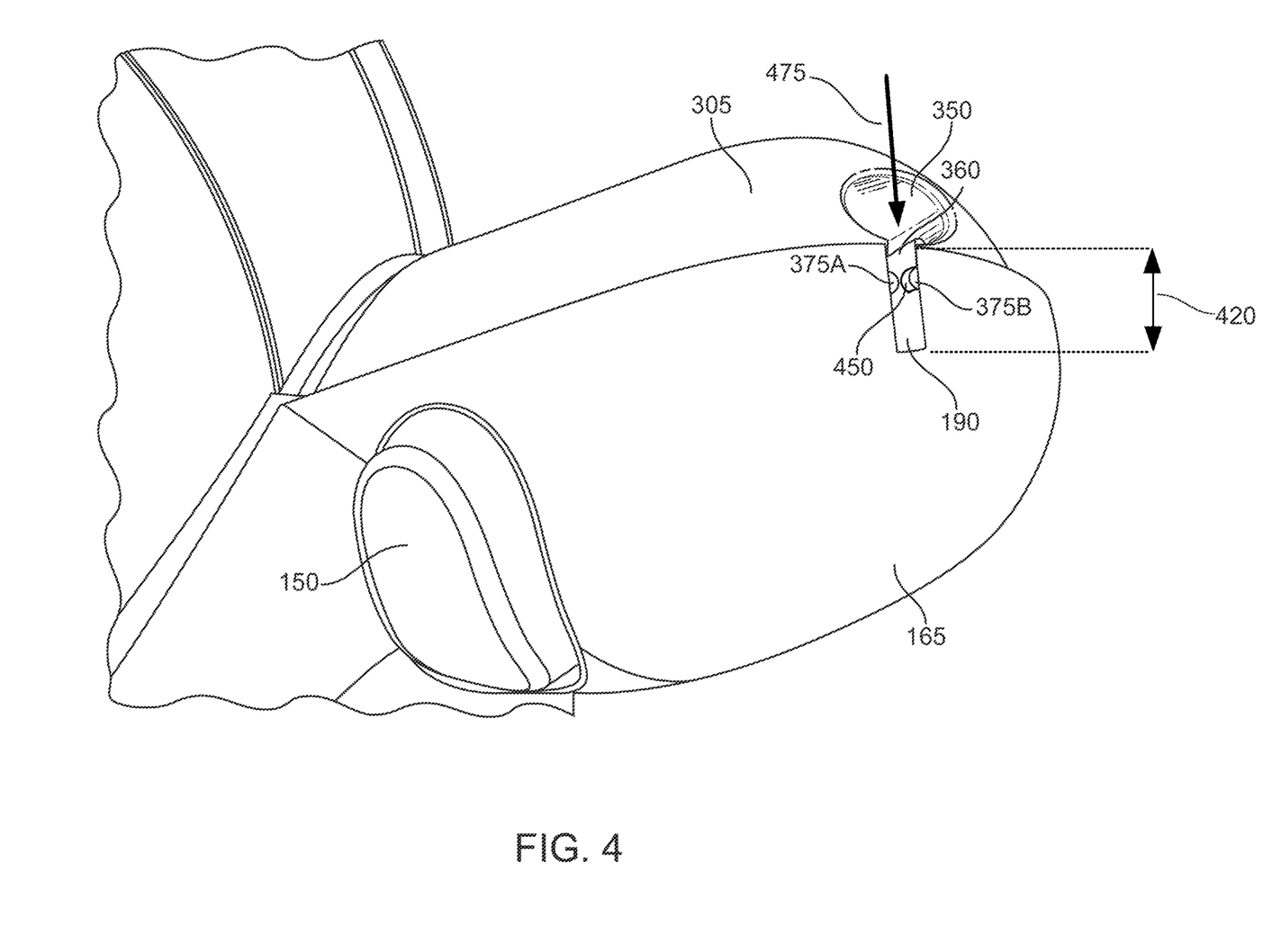
FIG. 4 depicts a perspective view of the channel of the controller, in accordance with an embodiment.

FIG. 4 depicts a perspective view of the controller 120, in accordance with an embodiment. For ease of depiction, the lanyard 110 is not shown in FIG. 4. Here, the second cavity 360 may have a depth 420. The depth 420 of the second cavity 360 is greater than the thickness 295 (e.g., see FIG. 2) of the first portion 250 of the lanyard 110. Therefore, the first portion 250 of the lanyard 110 can be inserted into the second cavity 360.

When the first portion 250 of the lanyard 110 resides within the second cavity 360, the first portion 250 of the lanyard 110 is secured within the second cavity 360 through one or more detents 375A and 375B protruding into the channel 190, in addition to the front cover 160 attached to the receptacle 305. The detents 375A and 375B protrude into the channel 190. As shown in FIG. 4, the detents 375A and 375B form a detent opening 450. The size of the detent opening 450 is less than the width 290 (see FIG. 2) of the first portion 250 of the lanyard 110 such that the first portion 250 of the lanyard 110 cannot exit through the detent opening 450 and deters the lanyard 110 from being pulled out upward and removed from the channel 190 unless sufficient force is applied for removal.

To couple the lanyard 110 with the controller 120, the first portion 250 of the lanyard 110 passes through the first cavity 350 to reside within the second cavity 360. More specifically, with the front cover 160 removed, the first portion 250 of the lanyard 110 can be first navigated into the first cavity 350 of the receptacle 305. Here, the walls 355 of the first cavity 350, which are curved, can guide the first portion 250 of the lanyard 110 towards the second cavity 360. The first portion 250 of the lanyard 110 enters into the second cavity 360 in the direction 475 shown in FIG. 4. Thus, the lanyard 110 can be coupled with the controller 120 when the first portion 250 of the lanyard 110 resides within the second cavity 360, as is shown in FIG. 3. In this coupled configuration, the front cover 160 can be reassembled onto the controller 120.

To decouple the lanyard 110 from the controller 120, the front cover 160 is removed from the controller 120. The first portion 250 of the lanyard 110 can exit the second cavity 360 by translating along a direction opposite of direction 475 shown in FIG. 4. The first portion 250 of the lanyard 110 can then be removed from the first cavity 350, which enables the lanyard 110 to be decoupled from the controller 120.

What is claimed is:

1. An assembly comprising:
    a controller comprising:
        a channel connecting an external side of the controller to an internal side of the controller;
        a receptacle located on the internal side of the controller, the receptacle comprising a first cavity and a second cavity, the first cavity and the second cavity connected to each other, the second cavity further connected to the channel;
    a lanyard comprising:
        a first portion residing within the second cavity of the controller; and
        a second portion passing through the channel of the controller and residing external to the controller.

2. The assembly of claim 1, wherein the receptacle further comprises one or more detents protruding into the channel.

3. The assembly of claim 1, wherein the one or more detents form a detent opening in the channel, the detent opening having a size that is less than a width of an end of the first portion of the lanyard.

4. The assembly of claim 1, wherein a size of the first cavity is greater than a size of the second cavity.

5. The assembly of claim 1, wherein a depth of the second cavity is greater than a depth of the first portion of the lanyard.

6. The assembly of claim 1, wherein the first cavity comprises curved walls, wherein the second cavity is located along the curved walls of the first cavity.

7. The assembly of claim 6, wherein the second cavity comprises curved walls that are in contact along the rounded end of the first portion of the lanyard.

8. The assembly of claim 1, wherein the first portion of the lanyard forms a rounded end.

9. The assembly of claim 8, wherein the first portion of the lanyard comprises layers of a stopper, a strap, and a fabric strip.

10. The assembly of claim 1, wherein the controller further comprises a removable front cover, the receptacle of the controller located internal to the removable front cover.

11. The assembly of claim 10, wherein the removable front cover is coupled to a rear panel of the controller, the removable front cover and the rear panel forming a handle of the controller.

12. The assembly of claim 11, wherein the channel is located at the rear panel of the controller.

13. The assembly of claim 1, wherein the receptacle further comprises a battery opening configured to receive a battery for powering the controller.

\* \* \* \* \*